(12) United States Patent
Willeford

(10) Patent No.: US 9,239,858 B1
(45) Date of Patent: Jan. 19, 2016

(54) HIGH-CONCURRENCY TRANSACTIONAL COMMITS

(71) Applicant: Amazon Technologies, Inc., Reno, NV (US)

(72) Inventor: James Cleveland Willeford, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 170 days.

(21) Appl. No.: 13/829,705

(22) Filed: Mar. 14, 2013

(51) Int. Cl.
*G06F 17/30* (2006.01)

(52) U.S. Cl.
CPC ................................ *G06F 17/30371* (2013.01)

(58) Field of Classification Search
CPC ................ G06F 17/30286; G06F 17/30595
USPC ........................................................ 707/803
See application file for complete search history.

(56) References Cited

U.S. PATENT DOCUMENTS

| 5,255,387 | A  | * | 10/1993 | Arnold et al. | |
|---|---|---|---|---|---|
| 7,051,028 | B2 | * | 5/2006 | Shi et al. | |
| 7,844,600 | B2 | * | 11/2010 | Hu et al. | 707/717 |
| 7,873,660 | B1 | * | 1/2011 | Wong et al. | 707/781 |
| 8,745,016 | B2 | * | 6/2014 | Mistry et al. | 707/704 |
| 2005/0125325 | A1 | * | 6/2005 | Chai et al. | 705/35 |
| 2009/0077135 | A1 | * | 3/2009 | Yalamanchi et al. | 707/200 |
| 2009/0177666 | A1 | * | 7/2009 | Kaneda | 707/100 |
| 2010/0017363 | A1 | * | 1/2010 | Bellamkonda et al. | 707/2 |
| 2014/0108642 | A1 | * | 4/2014 | Cheriton et al. | 709/224 |

* cited by examiner

*Primary Examiner* — Rehana Perveen
*Assistant Examiner* — Hicham Skhoun
(74) *Attorney, Agent, or Firm* — Baker & Hostetler LLP

(57) ABSTRACT

Systems and methods are presented for performing concurrent updates on a shared value. A request to update a shared value is stored in a secondary database table, and the update to the shared value is deferred. Application of an aggregation function to delta values stored in the secondary database table may produce an aggregate value that can be applied to the shared value in a consolidated update.

27 Claims, 7 Drawing Sheets

HIGH-CONCURRENCY TRANSACTIONAL COMMITS

BACKGROUND

Database management systems are often required to support numerous requests in parallel, as various processes and threads make requests to read and write to data maintained by the system. Concurrent access, however, is accompanied by an associated risk of conflicting updates and inconsistent reads. For example, a client application might attempt to view and edit a record. The process begins with the record being read from the database and ends with updated data being written to the database. However, if two client applications attempt to work with the same data simultaneously, there may be a risk that the two clients will conflict with each other—for example by attempting to write different values to the same column. Another possible conflict involves inconsistent reads. This might occur, for example, if one of the client applications is updating multiple records in the context of a single transaction. If the first client application's updates are underway when the second client attempts to read the same data, there is a risk that the second client will be provided with some of the first client's updates, but not all of them.

Various locking schemes or other concurrency control schemes may be employed to reduce or eliminate these risks. Database systems may provide various locking mechanisms that isolate client applications from each other's activity. The protection afforded by the database management system can be expressed as an isolation level. Some isolation levels impose locks on all data implicated within a transaction, while others provide minimal locking or even no locking at all. Higher levels of isolation can correspond to a decrease in system performance, because locks slow down other applications trying to read the same data.

For some applications, such as large-scale web applications, the cost of increased isolation can be prohibitive. One approach to avoiding these problems involves what is called optimistic concurrency, which avoids transaction-related locking under the belief that in most cases no conflicts will occur. Client applications written to use optimistic concurrency may include error detection and correction algorithms, so that they may properly react to conflicts when they occur. This approach, however, can be both complex and error-prone.

A further possible complication relates to the volume of updates. Even at lower levels of isolation, large volumes of updates to a table, row or individual field can cause serious performance degradation. As one example, an inventory value may track the in-stock quantity of a popular product. Numerous customers may attempt to check the availability of the product and then attempt to purchase it. If a high degree of isolation is imposed, for example by serializing each customer's access, the system could grind to a halt. If no isolation is imposed, there would be a significant risk of purchases exceeding the available inventory.

DETAILED DESCRIPTION

Figure 1:
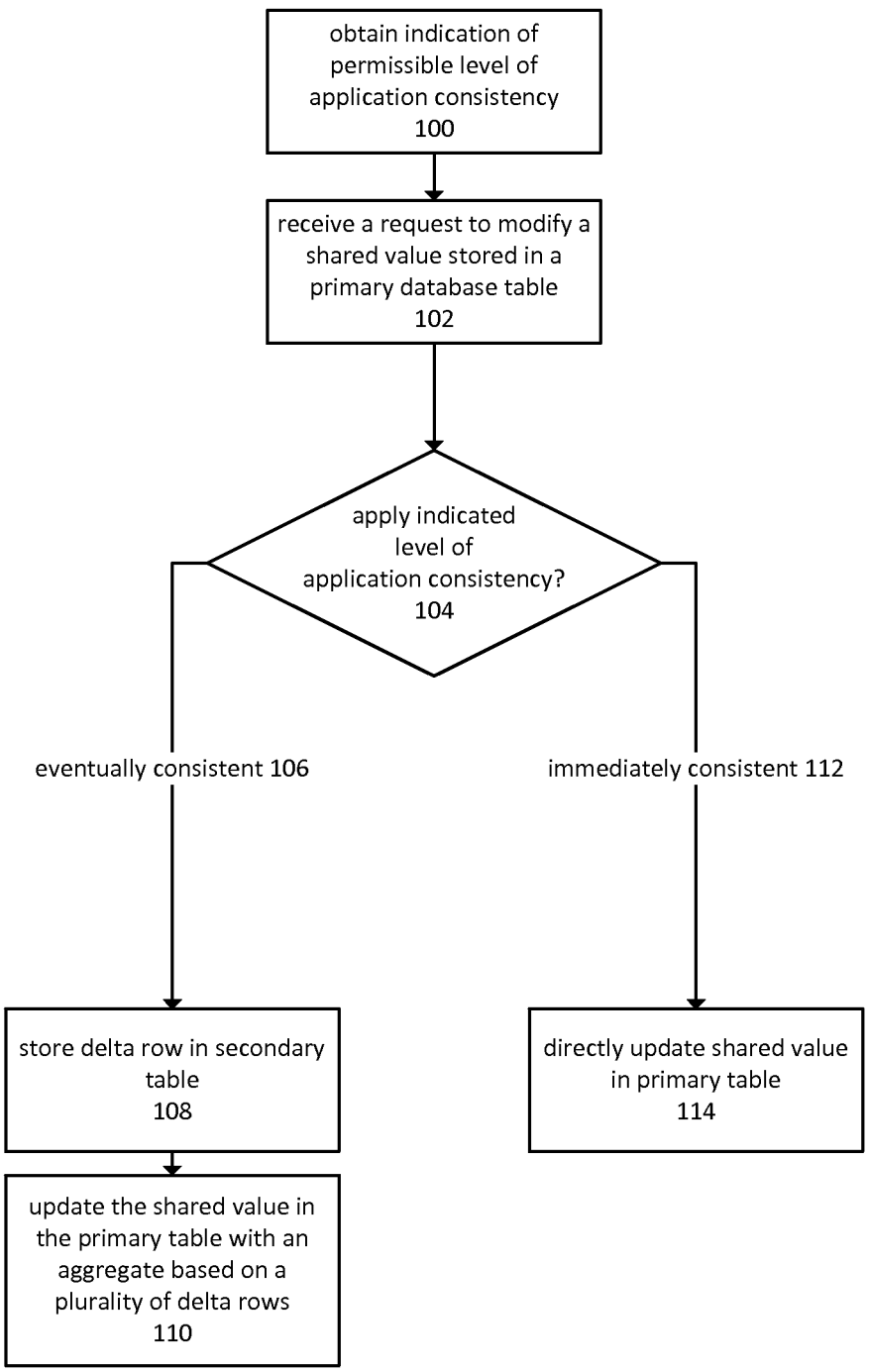
FIG. 1 is a flowchart depicting an embodiment for providing varying levels of application consistency when writing to a shared value in a primary table.

Various applications such as web sites, web services, n-tier and client server applications and so forth involve a high volume of concurrent requests made against a database management system, such as a relational database management system and various non-structured databases, such as those organized around collections of key-value pairs. In this environment, applications may be subject to errors caused by inconsistent use of shared data.

Application consistency involves providing an appropriate level of isolation and atomicity to read and update operations made by client applications, which may perform updates concurrently. For example, a database management system might hold bank account information in a table. If two client applications access the data concurrently to make withdrawals from the same account, there is a risk that the bank account might become overdrawn. To avoid this, the second client application might be prevented from changing the account balance while the first client's transaction is in progress. Similarly, the second client might be prevented from viewing the account balance during this time, because the figure might be wrong in light of pending changes. Application consistency therefore involves ensuring that applications work with data that is consistent with the overall state of the system. Note that the term application consistency includes consistency not just between separate applications, but also consistency between threads, processes and so forth.

Application consistency may typically be achieved using various degrees of isolation and usually comes at the expense of system performance. However, for some types of data it may be possible to modify the semantics of application consistency in a manner that provides an appropriate level of isolation but still maximizes system performance. For some types of data, it may be sufficient for the data to be guaranteed to be eventually consistent, or in other words the system may allow for a period of time in which application read or write operations can permissibly be inconsistent with the true state of the system.

Eventual consistency may be described as a level of application consistency in which data written to the system is guaranteed to reach the correct value at some point subsequent to the initial write. In other words, the initiation of the write and the actual update of the shared value are separated by an indeterminate period of time, and any reads on the shared data during that time are inconsistent with the true system state. However, the system is configured to effectively ensure that, despite the possibility of system failure, the shared value is eventually updated. In the interim period between the initial write and actual update of the shared value, read operations on the shared value may return whatever value is currently stored in the shared value's storage location. Until the write is propagated to that location, the shared value is inconsistent with the true state of the system. Another view of eventual consistency involves propagating and reconciling changes made to data in a distributed system. However, this view of eventual consistency may be supplemented by categorizing some classes of data as being better candidates for eventual consistency than others, or as being better suited to a particular level of eventual consistency.

Various types of data may be candidates for eventual consistency. One of these involves counters of various types. Examples include number of page visitors, popularity rankings, poll data, running totals and so forth. A general characteristic of this type of data is that while it should be approximately accurate, it does not need to be precisely accurate at the time the data is accessed. For example, a record counting the number of visitors to a web site might be approximately accurate at 1,000,001 visitors, even if the true value just became 1,000,012. The allowable range of approximately accurate data depends on the nature of the data and how the data is being used. Applications relying on such data may display these approximately accurate values to the user. However, database management systems have historically not provided support tailored to this type of data.

Some data is amenable to eventual consistency except when its value falls within a certain critical range. For example, it might be appropriate to display an approximated figure when an inventory value is five hundred but not when the value has fallen to close to zero, because a customer might be disappointed to place an order when nothing is left in stock. Accordingly, it may be desirable to use a different level of application consistency depending on the current range of a shared value. Eventual consistency may be applied outside of the critical range and switched to immediate consistency when the value is within the critical range.

In some cases, it may be desirable to have eventual consistency regarding some operations but not others. Continuing the inventory example, orders above a certain size might be applied to the shared value immediately, whereas smaller orders might be subject to the eventually consistent update semantic. This might be done, for example, by an examination of the size of the update compared to the current size of the shared value. Alternatively, a client application might indicate whether or not it wishes to employ eventual or immediate consistency.

In an embodiment, eventual consistency may also be determined based in part on one or more references to external factors, such as customer status, customer importance, supply-chain considerations and so forth. For example, information indicative of a customer's importance may be maintained on a storage device. If a customer is indicated as a high-importance customer, updates to the shared value triggered due to that customer's orders may be made immediately consistent. On the other hand, orders originating from low-importance customers might be made eventually consistent. These and similar indications of an acceptable update deferral status may be received and applied to the determination of an acceptable level of application consistency or an acceptable delay in applying an update.

A desirable characteristic for some applications and types of data is that updates that should fail do so immediately upon issuance. Thus it may be advantageous to provide a level of application consistency that has this characteristic. At least two approaches may be used. In the first, data is not written immediately but the intended update is evaluated against the current state of the shared value and pending updates to ensure that, if all previously pending writes to the shared value are processed, the just-issued write will succeed. A second approach involves using eventual consistency for most operations but applying immediate consistency to a subset that are seen as having high failure potential. Which operations fall into this category may be based on any number of factors including the prospective range of the shared value, business logic pertaining to the application, membership in a larger transaction and so forth. For example, a request to update an inventory value could be made immediately application consistent when the request pertains to a sale of at least 10% of the current inventory, or the sale is for a quantity that is above a threshold value.

Some classes of data require immediate application consistency. An example might be balance information for a bank account. Updates to this type of information may be written without delay, so that the data is always fully application consistent, to avoid critical failures such as an overdrawn account. In some embodiments, the actual update of the shared value may still be deferred, but nevertheless performed before any subsequent read operations.

One approach to providing varying levels of application consistency involves the use of one or more primary database tables containing shared data, and a secondary table comprising delta and referential information. The term shared value generally refers to a specific row or specific column within a table. It may comprise a single scalar value or numerous other forms of data such as arrays, vectors and so forth. Furthermore, the term shared data might also refer to a range of rows within a primary database table, or even refer to an entire table. Embodiments may utilize traditional relational database management systems, or they may use non-traditional database management systems, such as those organized around key-value pairings. In the latter case, a shared value could, for example, refer to the set of values associated with a common key, to a specific value associated with a key, to all values associated with a set of keys and so forth.

The secondary table contains delta information describing updates to a shared value in the primary database table. For example, if a customer places an order for five units of a product, the delta information might indicate the number five as a delta to an inventory quantity value held in a primary database table. The referential information contained in the secondary table refers to the location of the shared data within a primary table. In an embodiment the referential information might comprise a database name, table name, a column name and a key value that could be used to precisely locate a row within the table. Approaches such as these allow the secondary table to be agnostic regarding the location of the shared data.

The delta information stored in the secondary table is not constrained to indicating a relative change to a current shared value. The values contained in the secondary table may also be expressed in absolute terms. For example, if the shared value was a timestamp, the most recent corresponding timestamp value in the secondary table might override the current shared value.

FIG. 1 depicts an embodiment for providing varying levels of application consistency. Operation 100 involves obtaining an indication of a permissible level of application consistency. A desired or permissible level of application consistency may be determined, for example, by inference from the data type, manual or automated analysis and so forth. In some embodiments, a map can be constructed to provide a correspondence between a shared value and a permissible level of application consistency. A permissible level of application consistency may be expressed as a permissible delay in propagating an update request to the shared value in the primary table. A mapping could also be constructed between a data type and a permissible level of application consistency. Maps may be constructed in any number of ways, such as through compiled case statements, enumerated values, database tables and so forth.

Once determined, the desired or permissible level of application consistency may be indicated to the system in various ways, such as encoded into schema information, by a secondary value kept with the shared value, via application programming interface, inferred from type information and so forth.

A request to modify a shared value may be received at 102. A shared value may take a variety of forms including tables, rows, key-value pairs, individual values in a table or key-value collection and so forth. In some embodiments, the shared value comprises a single column within an identifiable row stored in a relational database. Accordingly, the request to modify may comprise values, rows, key-value pairs and so forth as necessary to indicate the desired change to the shared value.

It may be advisable to combine aspects of operation 100 with operation 102, for example, by supplying an indication of a permissible level of application consistency with the request to modify the shared value.

The request to modify a shared value may also contain information indicative of the location of the shared value. In one embodiment, the location is expressed as a structured query language ("SQL") update statement. In another, the location is expressed as an identifier, such as a key, that may be mapped to the shared value's location. Another possible mechanism involves an application programming interface, which explicitly or implicitly indicates the location of the shared data.

At 104, a determination is made regarding whether to apply the indicated level of application consistency. In some cases, eventual consistency is indicated as appropriate in all circumstances for the shared value being updated. In other cases, immediate application consistency is required for the shared value being updated. The determination in these cases is straightforward. However, other levels of application consistency may require a more complex determination.

In some cases, the appropriate level of application consistency may depend on the current state of the shared value. Eventual consistency might be used except when the shared value has moved within a critical range. For example, a quantity figure may be monitored to determine whether it has fallen below a threshold level or some other critical range. Above that level, eventually consistent updates may be appropriate. Below that level, the request to update may be processed synchronously to ensure that the recorded quantity does not fall below zero.

If eventual consistency is to be employed, delta rows may be written to the secondary table via lightweight insert operations. The secondary table may be tuned, using conventional database management techniques, to ensure that the insert operations are efficient. In addition, they may be wrapped in a local or distributed transaction to insure that the insert into the secondary table, and any associated operations, are performed as an atomic unit.

The delta row written to the secondary table may comprise various elements. These may include a delta value, information indicative of the location or identity of the shared value, an indication of an aggregation function and an indication of a logical lock. The delta value may indicate a relative or absolute value that may be used to update the shared value. Location information may be used to determine where the target shared value is located. The indication of an aggregation function may indicate a function for consolidating delta rows into a single update of the shared value. The indication of a logical lock may be used as a mechanism to prevent lost or duplicate updates.

The depicted embodiment shows support for two levels of application consistency Immediately consistency is depicted by branch 112, while eventual consistency is depicted by branch 106. Other embodiments may support additional levels, which may include various aspects of eventual consistency described herein. In an embodiment, an additional level of application consistency would be eventual consistency with a maximum permissible delay. In this embodiment, rows would be written to the delta table, but the system would ensure that the updates propagated to the shared value before the maximum permissible delay is exceeded.

In another embodiment, a level of application consistency could be provided that simulates immediate application consistency. This approach involves deferring the update to the shared value by writing a delta row representative of the update to the secondary table. The update to the shared value may be deferred until just prior to the next subsequent read operation. In this embodiment, care should be taken to ensure that read operations do not bypass the mechanism that triggers the update to the shared value.

Returning to the operations depicted in FIG. 1, when an update must have immediate consistency, the shared value in the primary table may be updated at 114. This may, for example, comprise issuing a SQL statement that causes the desired change to a shared value kept in a database. During the update, a row or table corresponding to the shared value may be locked and inaccessible to other processes or threads. Because database management systems provide varying levels of granularity with respect to locking, the extent of the lock may depend on the capabilities of the underlying database.

When eventual consistency is to be applied, operations proceed along branch 106. A delta row representative of the update may be stored in a secondary table, at operation 108. The delta row may contain various values indicative of the desired update to a shared value, including the desired value, data for locating the shared value in a primary table and other information as described in the present disclosure.

At some later time, the shared value in the primary table is updated at operation 110. A number of delta rows pertaining to the same shared value may have accumulated in the secondary table prior to the update. These rows may be aggregated into a single update, based on application of an appropriate aggregation function to the individual delta values stored in the delta rows. In this manner, the number of updates directly to the stored value is minimized, helping to maintain good performance by reducing the need to enforce locks on the shared value.

The secondary table may be maintained within the same database system or other repository as the primary table, or it may be maintained remotely. An advantage to collocating the primary and secondary tables is that local, rather than distributed, transactions may be used to ensure that both the primary and secondary tables are updated in a single atomic transaction without having to resort to the use of a distributed transaction manager.

Figure 2:
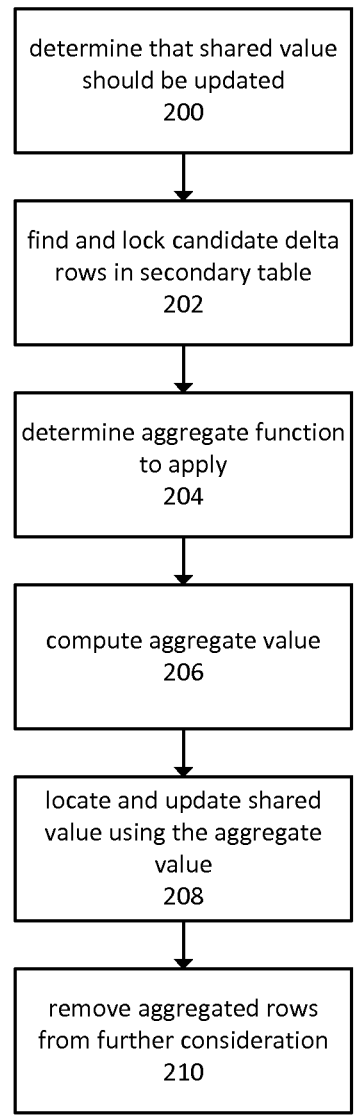
FIG. 2 is a flowchart depicting an embodiment for updating a shared value in a primary table based on delta values stored in a secondary table.

FIG. 2 depicts an embodiment for updating a shared value in a primary table based on delta values stored in a secondary table. The secondary table may contain numerous delta rows indicative of updates to a shared value in the primary table. To reduce contention on the primary table, multiple delta rows in the secondary table may be aggregated into a single update on the primary table. The update on the primary table may be performed using appropriate table or row locks and may also be wrapped in a local or distributed transaction. Doing so helps to ensure that delta rows are not removed from the secondary table before an update is written to the shared value in the primary table. Although such actions may degrade performance, aggregating updates may significantly improve performance because comparatively few updates are written directly to the shared value in the primary table.

On the other hand, using aggregation results in a delay in writing the value. Updates written first to the secondary table may be considered eventually consistent because the shared value in the primary table is not updated immediately. Any process reading the shared value directly from the primary table will read an out-of-date value until the update is propagated to the primary table. In some embodiments, a maximum amount of delay may be specified. When the delay in propagating the update exceeds or approaches a threshold value, an aggregator process may ensure that updates are written to the shared value before the maximum amount of delay is exceeded. Some embodiments may issue an update when a count of delta rows applicable to a shared value exceeds a threshold value.

At operation 200, a determination is made that one or more shared values should be updated. The determination may be made based on a wide variety of factors and conditions. Some embodiments may simply attempt to update all shared values on a periodic basis. Other embodiments may incorporate one or more factors such as the length of time since the last update, the number of delta rows pertaining to a single shared value, the age of the delta rows relative to the time the update was first issued, a permissible amount of delay, the time of day and so forth. In an embodiment, the secondary table is maintained in a relational database system and the determination is based on a SQL query of the secondary table. Execution of the SQL query may determine that there are a sufficient number of delta rows pertaining to a particular shared value, indicating that it has become worthwhile to update the shared value in the primary table.

The frequency of updates on the shared value in the primary table may be a factor in overall performance, and therefore it may be desirable to reduce the frequency of updates to the shared value. One approach is to delay updates to a shared value until enough pertinent delta rows are available in the secondary table. In some embodiments, it may be desirable to control the allowable times of day in which updates are permitted. For example, updates may be allowed based on a function of either time of day and overall frequency so that fewer updates are issued during busier times of day. In addition, some embodiments might impose limits on the maximum frequency of updates to a shared value, or more broadly limit updates to a table or collection in which shared values reside. Many other variants are possible.

Various embodiments may also act to ensure that updates are propagated before a maximum permissible delay is exceeded. In an embodiment, this may be accomplished by setting an appropriate periodic interval at which an aggregator process attempts to propagate all available updates. Other embodiments may track the current delay for each update request. The delta row may, for example, contain a timestamp indicative of when the update request was issued. The delta rows may then be aggregated prior to any one of the expiry times indicated by the timestamps.

At operation 202, a process may locate a set of delta rows within the secondary table pertaining to a particular shared value. This may be done, for example, by issuing a SQL query with an appropriately fashioned WHERE clause. In some embodiments, operations 200 and 202 are combined to form an integrated operation, possibly leveraging a single SQL query.

Finding delta rows pertaining to the same shared value may be based on location information in the delta rows. Using SQL or other query mechanisms appropriate to the database management systems, rows containing the same location information may be identified as targeting the same shared value. In some embodiments, the location information in the delta row may be expressed as a query, possibly as an SQL query or as a key-based update request. In these cases the shared value may be identified by parsing the query.

Care must be taken to avoid duplicating or losing entries in the secondary table during the aggregation process. In general, candidates for aggregation should be locked in some fashion until the corresponding aggregated update has been successfully propagated to the primary table. One approach involves using conventional database locking mechanisms, including pessimistic locking schemes that lock rows aggressively, while the aggregation and update process is underway. However, it may be preferable to use a logical lock. The delta rows in the secondary table may contain a column indicating that the row is to be considered as locked. Thereafter, only the process that initially marked the delta row as locked may incorporate the delta row into an aggregate update. The locking process is depicted as part of operation 202. Although the delta row locking may be performed as a distinct operation, it may be desirable to initiate the locks at the same time as the rows are selected, for example as part of a single database transaction. This helps to prevent delta rows from being inadvertently selected by multiple aggregation processes.

Operations 204 and 206 involve determining an aggregate value for a set of delta rows pertaining to a shared value. The set of delta rows may be combined to form a smaller number of updates to the primary table. Each delta row may contain an absolute or relative update to the shared value, along with an indication of an aggregation function that may be used to combine the absolute or relative updates into a single value. A mapping may be constructed indicating a correspondence between the indication of an aggregation function and the actual function. The map itself may take many forms, such as compiled case statements, function pointers, or various other static or dynamic references between a value stored in the delta row and code that may be executed to compute an aggregated value based on a set of delta values.

At operation 204, the aggregate function is selected. In some embodiments, rather than each delta row containing an explicit indication of an aggregation function, the indication may be implied by some other factor such as the data type. It might, for example, be implied based on a mapping between shared values and aggregation functions. In other embodiments, the data type of the shared value may be used to imply the aggregation function. For example, a shared value having a timestamp data type might be implied to correspond to an aggregation function that selects the most recent time among its inputs as its output.

At operation 206, the aggregation function is employed to calculate an aggregate value for the update. The aggregation function combines one or more delta rows into a smaller number of updates on the primary table. For example, if ten rows in the secondary table indicate an update to a shared counter value, each by two, a summation aggregation function could combine these rows, resulting in a single update that increments the shared counter value by twenty.

A variety of aggregation functions are possible Summation involves adding corresponding delta row values from the secondary table to the shared value, while subtraction reduces them. Although some values cannot be mathematically aggregated, they can still be summarized, averaged or otherwise condensed into a single value. For example, a timestamp value might be summarized as the most recent time value. Various other summation rules may be devised for fields such as enumerated values, textual values and so forth. An aggregation function might select a maximum or minimum time from among its input value as its output value. Another possibility involves using the delta row values in the secondary table as input to a state machine that determines an end state for the shared value. Group by or similar aggregations are also possible, resulting in a set of rows to insert into the primary table.

At operation 208, the shared value is located and updated using the aggregate value. A process may use row location data contained in the delta row to locate and update the shared value. Various techniques may be used to identify the location, including a SQL query, primary table name, primary key values and so forth. In an embodiment, parameter values are kept in the delta row and a parameterized SQL query is used to update the shared value. The delta rows may also contain an enumerated value or similar identifier of a shared value, and a map may be constructed to map between the enumerated value and a shared location. The map may take various forms such as compiled case statements, function pointers, hash tables and so forth. These may be used to determine an appropriate query or code segment to execute in order to update the shared value, such as the parameterized query.

In an embodiment, information and procedures necessary to compute an aggregate value, locate the shared record, and update the shared record may be a component of a class, function or other executable code, and associated data and resources. As a non-limiting example, the indication of an aggregation function might comprise a reference to an object-oriented class. Code and data associated with the class might comprise an appropriate aggregation function, location information for the shared value, and code to update the shared value using the results of the aggregation function.

At operation 210, the delta rows reflected by the aggregate used to update the shared value may be removed from consideration in later aggregation attempts. In some cases of some embodiments, the set of delta rows to be removed from consideration may be equivalent to the set of rows locked in operation 202. Rows may be removed from consideration, for example, by deleting the delta row from the table, by marking the delta row with a value indicating that the row should be deleted, using a high-water mark and so forth.

Figure 3A:
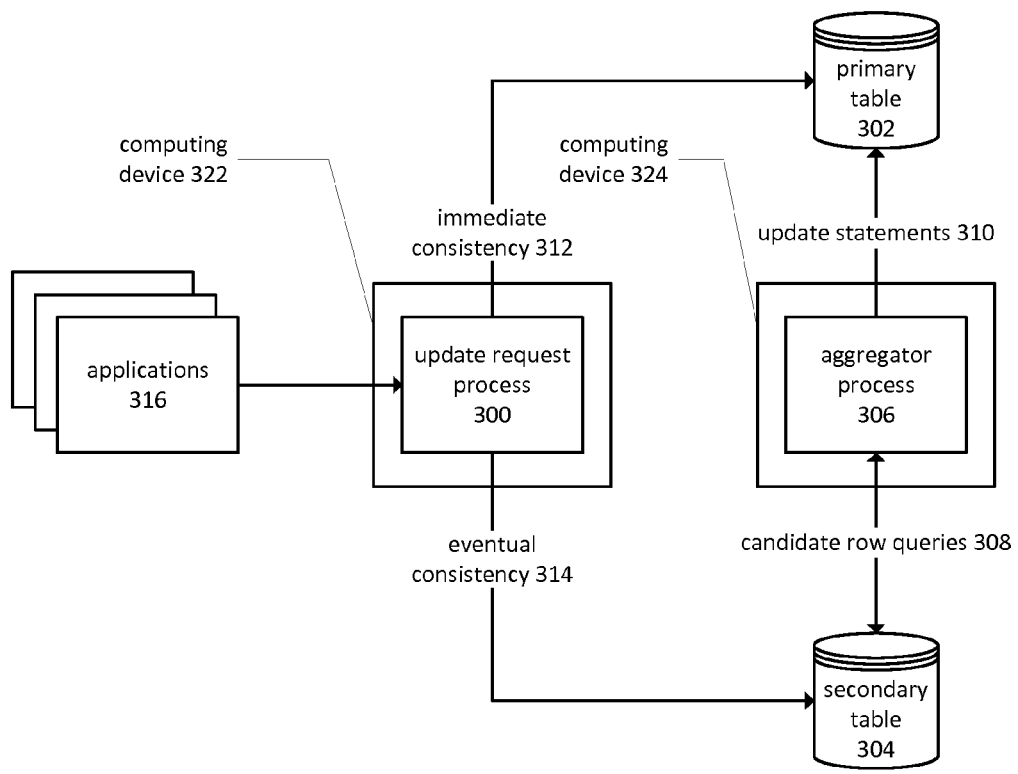
FIG. 3A is a block diagram depicting an embodiment of a system for providing varying levels of application consistency comprising an update request process and an aggregator process.

FIG. 3A depicts an embodiment of a system supporting varying levels of application consistency comprising an update request process and an aggregator process. Computing device 322 may be configured to execute update request process 300, which receives a request to update a shared value maintained in primary table 302. The requests may be issued by various applications 316. As used herein, the term process may refer to a program, component, library, executable code and/or circuitry configured to perform the indicated functions. In an embodiment, update request process 300 may be integrated into a client program that initiates the update request.

Based on various factors described herein, update request process 300 determines a permissible level of application consistency. In some cases and embodiments, immediate consistency is required for an update. If so, following branch 312, the update is immediately propagated and applied to primary table 302.

When eventual consistency is permissible or desired, flow proceeds along branch 314. Update request process 300 may cause a delta row to be stored in secondary table 304. The delta row comprises various elements described herein, including location data implying or referring to primary table 302 and the specific location of the shared value. Note that although only a single primary table 302 is depicted, any number of primary tables may be supported, for example by utilizing the location data to refer to the relevant primary table. Additional secondary tables may also be supported. Furthermore, the term table may refer to various forms of data collections, such as key-value collections.

In an embodiment, computing device 324 is configured to execute aggregator process 306, which is configured to issue candidate row queries 308 to secondary table 304. More generally, aggregator process 306 may use various computations, data retrievals and so forth to determine which delta rows should be selected for aggregation. Execution of the candidate row queries may determine, as well as lock, a set of delta rows that are candidates for aggregation. In some embodiments, not all rows corresponding to a particular shared value will be propagated for update. This may occur, for example, if applying a large aggregate value would cause the shared value to exceed some predetermined threshold. Delta rows may be ordered according to time of receipt, or other priority indications, and included or excluded from aggregation according to that order.

It may be desirable in such cases to only allow updates that may logically succeed to be included in the aggregate update. In an embodiment, an aggregate value is computed for a set of delta values contained in a set of delta rows. If applying the aggregate value to the shared value would result in a constraint violation, such as the shared value moving outside of an allowed range, the update is not propagated. Alternatively, a subset of the delta values may be included in the update. The included delta values may be selected based on a first-in, first-out method or any number of alternative computations.

Once an appropriate set of delta rows has been selected, aggregator process 306 determines an appropriate aggregation function. The aggregation function is then applied to the update values stored in the selected set of delta rows, producing an aggregate value. Update statements 310 are issued against primary table 302, causing the shared value stored in the primary table to be updated.

Although primary table 302 and secondary table 304 are depicted in FIG. 3 as residing in separate and distinct databases, they may be housed in the same database system. This may be preferable where changes to both the primary and secondary tables are to be wrapped in a single atomic transaction.

Figure 3B:
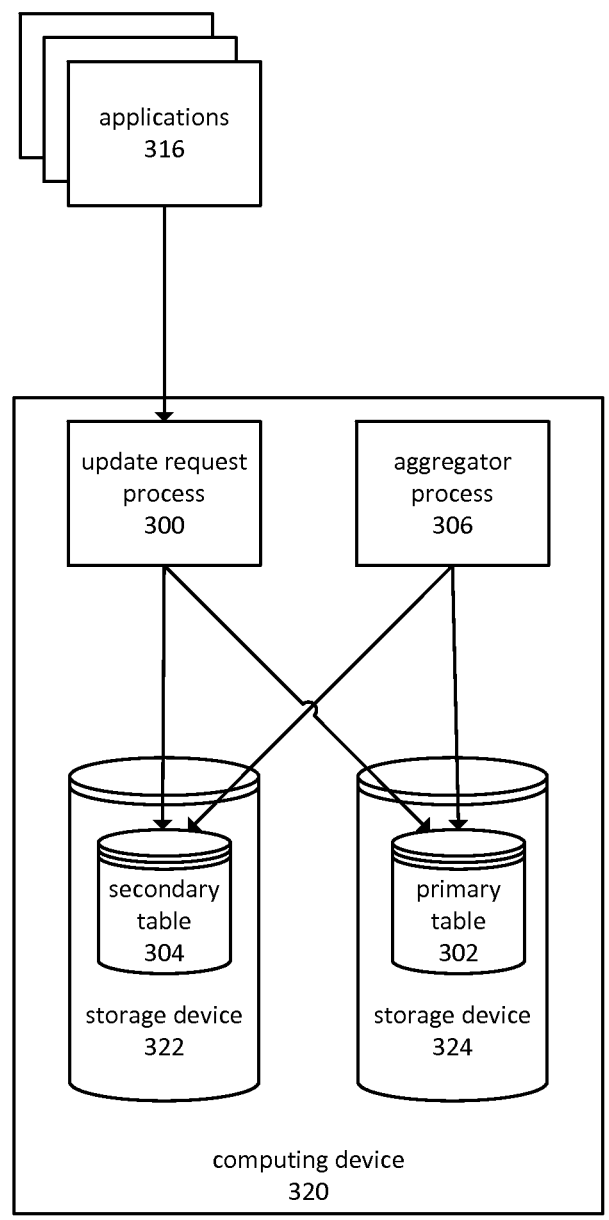
FIG. 3B is a block diagram depicting an alternative view of a system for providing varying levels of application consistency.

FIG. 3B depicts an alternative view of a system supporting varying levels of application consistency. Computing device 320 may be configured to execute update request process 300, which receives update requests from applications 316. It writes to secondary table 304 when the update is compatible with eventual consistency and to primary table 302 when the update must be made immediately consistent.

Computing device 320 is connected to or comprises storage devices 322 and 324. Primary table 302 is maintained on storage device 324, while secondary table 304 is maintained on a separate storage device 322. This arrangement may be advantageous where the high frequency of writes to secondary table 304 might otherwise interfere with the operation and performance of primary table 302. The use of solid state storage devices may reduce the need for separate storage, but bandwidth considerations and other such factors may also be considered.

Computing device 320 may be configured to execute aggregator process 306. Because storage devices 322 and 324 are connected to the same computing device, updates involving both primary table 302 and secondary table 304 may be performed in the context of a local transaction, rather than a more resource-intensive distributed transaction.

Figure 4:
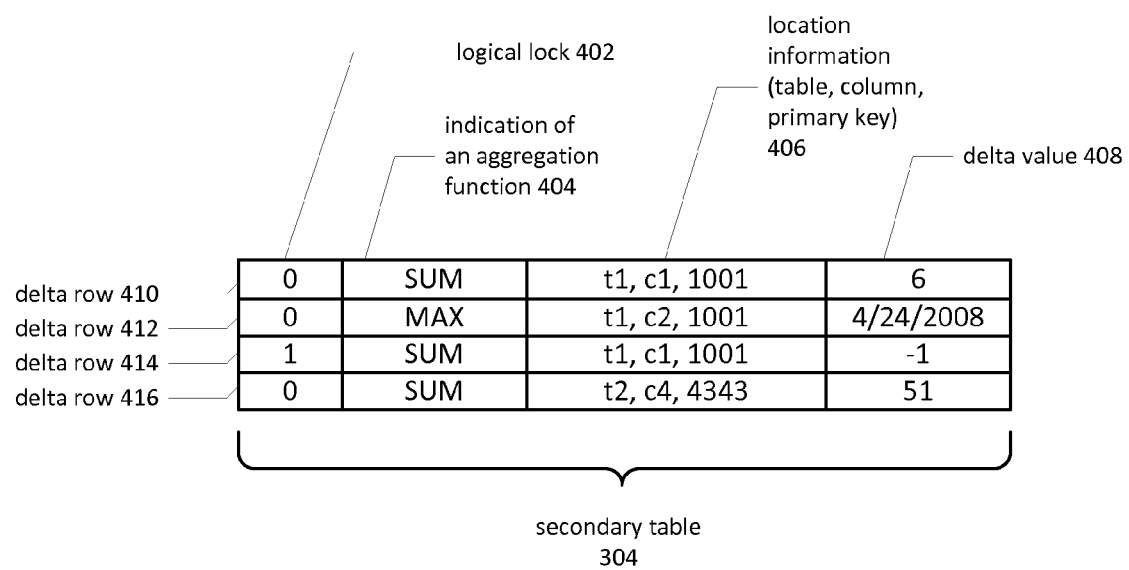
FIG. 4 is an illustrative example depicting an embodiment of a secondary table containing delta rows.

FIG. 4 depicts an embodiment of a secondary table 304. Logical lock 402 is a column having values indicating that the corresponding delta row is currently in use and under consideration as an update candidate and should not be used by any aggregation process other than the one that initiated the lock. Although depicted as a binary value, it may be desirable to use a process ID or similar value identifying the owner of the lock. In addition, some embodiments may use locking mechanisms other than the logical lock method depicted here. In an embodiment, locking mechanisms provided by the database management system are employed.

Indication of an aggregation function 404 is a column indicating the aggregation function that can be applied to consolidate one or more delta rows in secondary table 304. The depicted embodiment shows indication of an aggregation function 404 as an enumerated value, but many alternative embodiments are possible.

An aggregation process may use location information 406 to determine candidates for updating a shared value in a primary table. For example, delta row 410 and delta row 414 may be aggregated into a single update, because row location information 406 indicates that delta rows 410 and 414 both pertain to column "c1" of table "t1" for a row whose primary key value is equal to "1001." In the depicted embodiment, location information 406 is defined as including a table name, a column name and a primary key value identifying the row. However, the depicted embodiment of location information 406 is provided only as a non-limiting example. Those of ordinary skill in the art will appreciate that the format of the location information may take many forms other than the example depicted in FIG. 4. In some embodiments, location information 406 is not contained in the secondary table, and is instead inferred from context, supplied by an application programming interface and so forth.

Delta row 412 cannot be considered for aggregation with delta rows 410 and 414, because it refers to column "c2" instead of "c1," and therefore does not refer to the same shared value.

Although updates to different shared values cannot be consolidated into a single update, some embodiments may apply separate aggregations for each shared value and group updates to the shared values in a single update statement or batch of update statements. For example, a single SQL statement could update both column "c1" and column "c2" in a row whose primary key value is equal to 1001. If the shared values are in different location, a batch statement might be generated, consistent with the capabilities of the database management system. These approaches may be advantageous because they reduce row locking and reduce the number of network round-trips to and from the database management system. Delta row 416 refers to yet another shared value.

Although not depicted in FIG. 4, in some embodiments a shared value may be an entire row or even an entire table. In such cases the entire row or entire table may be updated in a single batch statement. In some embodiments, a single update may be used to insert multiple new rows into a shared table with a single update. This might occur, for example, when the aggregation function is a group by operation, which could summarize the distinct values stored in the delta rows. Another possibility involves applying an aggregation function that produces both minimum and maximum value determinations. In this case, application of the aggregation function could produce two values to be stored as separate shared values. It may be advantageous, in such cases, for the two shared values to be located in separate columns of the same database row, although many alternative embodiments are possible.

Delta values 408 may take various forms depending on the nature of the shared data and the type of aggregation function that is to be employed. For example, delta rows 410 and 414 may be considered as incremental updates to a shared value. In FIG. 4, if these values are summed together they indicate an aggregate value of 5, indicating that the shared value should be increased by 5 in a single update.

Figure 5:
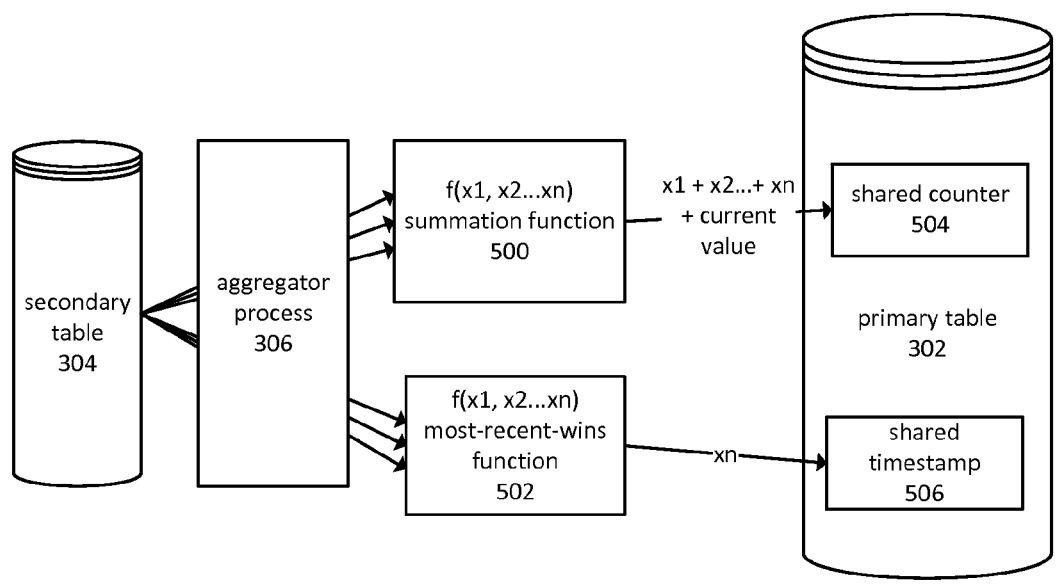
FIG. 5 is a diagram depicting an embodiment for applying aggregation functions to compute and store updated shared values.

FIG. 5 depicts an embodiment for applying aggregation functions to compute and store updates shared values. Aggregator process 306 extracts one or more values from secondary table 304. It then applies the one or more values to an appropriate aggregation function. FIG. 5 depicts, by way of non-limiting example, two possible aggregation functions. Summation function 500 sums the delta values (for example, delta values 408, depicted in delta rows 410 and 414 of FIG. 4) and applies the resulting value to a shared value in primary table 302, depicted as counter value 504. Counter values are increments to the current shared value, so the output of the summation function is added to the current shared value and the sum becomes the new shared value.

Most-recent-wins function 502 is another example of an aggregation function. It might apply to the delta value 408 of delta row 412 of FIG. 4. By application of the most-recent-wins aggregation function, the most recent data value is applied to shared timestamp value 506.

Figure 6:
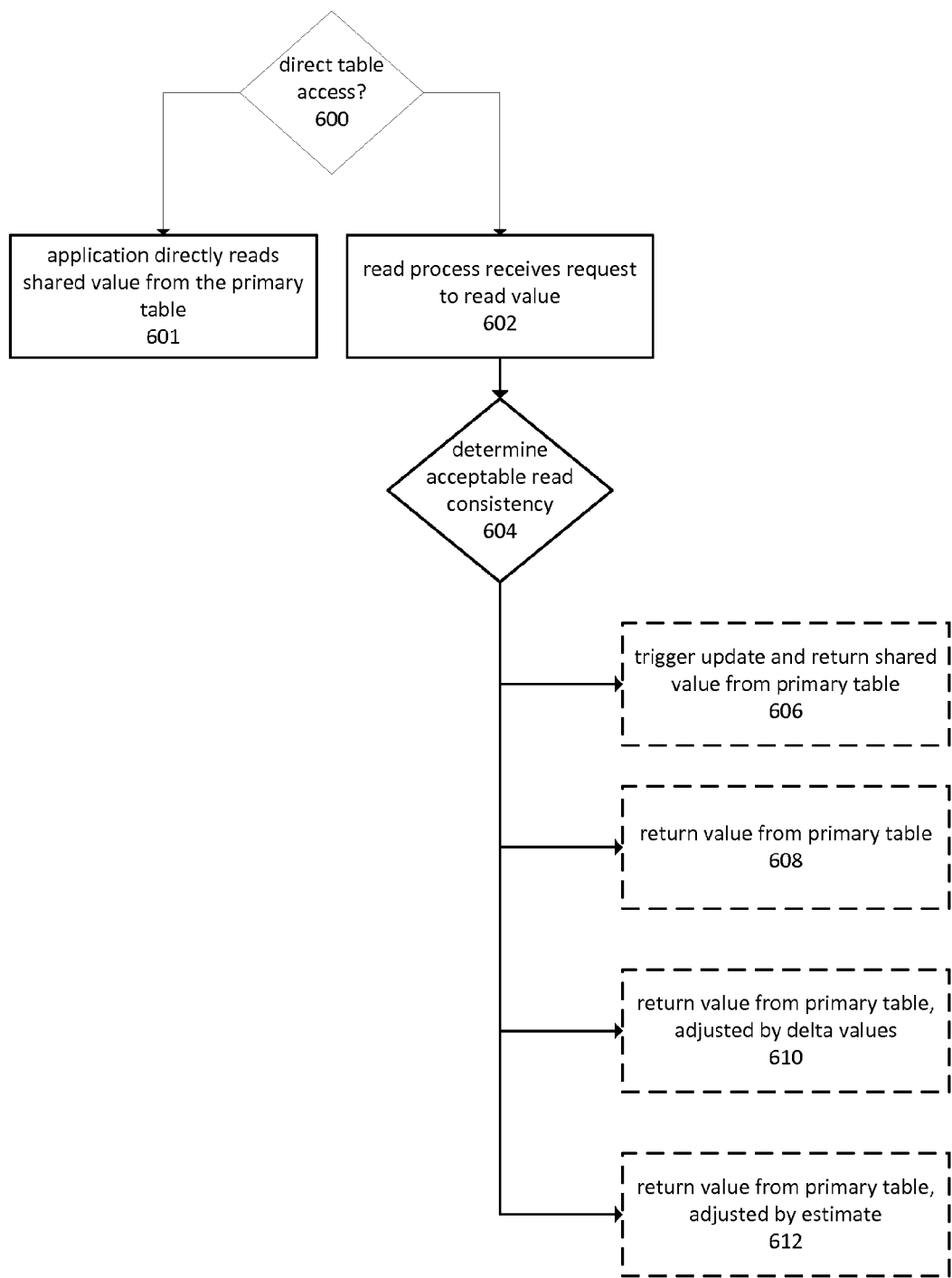
FIG. 6 is a flowchart depicting an embodiment for reading a shared value.

FIG. 6 depicts an embodiment for reading shared values from the primary table. In some embodiments, the shared value may be read directly from the database management system, using whatever facilities the system provides. This may be determined at operation 600. If the value may be read directly, a SQL query, get request or similar mechanism may be employed at operation 601 to read the shared value.

Requests to read values may be directed to a read process. At operation 602, the read process receives a request to read a shared value. At 604, the read process determines an acceptable level of consistency for the read operation. Based on this determination, the read process may select an appropriate operation for obtaining and returning a value indicative of the shared value.

It may be desirable to trigger an update by the aggregator process, as depicted by operation 606. This may involve causing the operations depicted in FIG. 2 to be performed. After updates to the shared value have been processed, the updated shared value now stored in the primary table may be returned.

Another option involves simply returning the current value from the primary table, as depicted by operation 608. This value will not be indicative of any deferred updates currently stored as delta rows in the secondary table. Accordingly, other embodiments may compute an adjustment to the shared value by applying an aggregation function to the current set of delta values and return the sum of the shared value and the adjustment value. Another possibility is to return the current value from the primary table adjusted by an aggregate value calculated from the delta values, as depicted by operation 610.

In another embodiment, the shared value from the primary table is adjusted by an estimated rate of change, as depicted by operation 612. The rate of change may be computed, for example, by an estimate derived from delta rows processed by the system. It may be advantageous to compute an estimate when propagating updates from the secondary table to the primary table. This approach prevents the need to scan the secondary table only for the purpose of calculating the rate of change.

Aspects of the present disclosure may be implemented as a program module that interacts with the database management system through various database client libraries or call level interfaces. In other embodiments, various elements disclosed herein could be integrated into the database management system. For example, a desired level of application consistency could be provided to the database management system when a table is first defined. Similarly, various techniques for reading data described herein could also be integrated into the database management system so that read operations that involve the described techniques are transparent to the database user.

Each of the processes, methods and algorithms described in the preceding sections may be embodied in, and fully or partially automated by, code modules executed by one or more computers, computing devices or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process operations or steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, operations and/or steps. Thus, such conditional language is not generally intended to imply that features, elements, operations and/or steps are in any way required for one or more embodiments or that one or more embodiments necessarily include logic for deciding, with or without author input or prompting, whether these features, elements, operations, and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, operation, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A system for performing concurrent updates on data stored in a database, the system comprising:
   one or more storage devices configured to store a first database table, the first database table configured to maintain a first value concurrently accessible to a plurality of client applications;
   the one or more storage devices configured to store a second database table, the second database table configured to maintain rows comprising data indicative of a request to update the first value and information indicative of a location of the first value within the first database table; and
   one or more memories having stored thereon computer-readable instructions that, upon execution, cause the system to at least:
   receive a request to update the first value;
   receive information indicating that the first value is compatible with eventually-consistent updates;
   store in the second database table, based at least in part on the information, a row corresponding to the request to update the first value;

calculate an aggregate value by applying an aggregation function to rows in the second database table corresponding to updates to the first value; and
cause the first value to be updated using the aggregate value.

2. The system of claim 1, wherein the information indicating that the first value is compatible with eventually-consistent updates is received from a client application.

3. The system of claim 1, further comprising the one or memories having stored thereon computer-readable instructions that, upon execution, cause the system to at least:
determine a permissible delay in writing an application-consistent value to the first value, the application-consistent value indicative of a state of the plurality of client applications.

4. The system of claim 1, further comprising the one or memories having stored thereon computer-readable instructions that, upon execution, cause the system to at least:
read the first value in response to a request from one of the plurality of client applications before the first value is updated.

5. A computer-implemented method comprising:
receiving, at a computing device, a first request to update a first location in a first database table maintained on a storage device, wherein the first location is configured to store a first value;
when delays to consistency of updates to the first location are permitted, storing data in a first item in a second database table, the data corresponding to the first request to update a first location;
receiving, at the computing device, a second request to update the first location in the first database table;
storing data in a second item in the second database table, the data corresponding to the second request to update the first location;
calculating, by execution of computer-readable instructions stored in one or more memories, an aggregate value based on the data stored in the first and second items; and
updating the first location using the aggregate value.

6. The method of claim 5, further comprising determining that updates are deferrable based on an indicated level of application consistency.

7. The method of claim 5, further comprising determining that updates are not deferrable because the first value is within a critical range.

8. The method of claim 5, further comprising determining that updates are not deferrable based at least on an indication of a deferral status.

9. The method of claim 5, wherein the first database table is a relational database table.

10. The method of claim 5, wherein the first database table comprises a key to value mapping.

11. The method of claim 5, further comprising determining that a new value based on the first value and the aggregate value falls within a critical range or is invalid.

12. The method of claim 5, further comprising receiving a plurality of requests to modify the first location, the plurality of requests originating from a plurality of client applications.

13. The method of claim 5, wherein the first item in the second database table comprises one or more of information indicative of the first location and information indicative of an aggregation function.

14. The method of claim 5, wherein the first item in the second database table comprises a logical lock indicative of current use by an aggregator process.

15. The method of claim 5, wherein the aggregate value is calculated using an aggregation function comprising one of summation, minimum value, maximum value, most recent value, least recent value, count, average, mean, median, count, and group by.

16. A non-transitory computer-readable storage medium having stored thereon instructions that, upon execution by a computing device, cause the computing device to at least:
construct a mapping between a first value and an indication of an aggregation function, the first value stored in a primary table, and between the first value and an indication of a permissible level of application consistency;
identify a set of rows in a secondary table, the set of rows corresponding to deferred requests to update the first value, the set of rows identified based on information indicative of a location of the first value;
compute an aggregate value by applying the aggregation function to the set of rows; and
update the first value using the aggregate value.

17. The computer-readable storage medium of claim 16, having stored thereon instructions that, when executed by the computing device, cause the computing device to at least:
update the first value using the aggregate value based on a determination that a count of rows in the set of rows exceeds a threshold value.

18. The computer-readable medium of claim 16, wherein the mapping comprises information stored in the secondary table.

19. The computer-readable medium of claim 16, wherein the permissible level of application consistency is indicative of a permissible delay in updating the first value.

20. The computer-readable medium of claim 16, wherein the indication of the aggregation function corresponds to one of summation, averaging, mean, median, count, most-recent-wins, minimum value, maximum value, or a selection of an end state.

21. The computer-readable storage medium of claim 16, having stored thereon instructions that, when executed by the computing device, cause the computing device to at least:
determine that a new value based on the first value and the aggregate value is invalid.

22. A system for performing concurrent updates on data stored in a database, the system comprising:
one or more storage devices configured to store a primary table;
one or more storage devices configured to store a secondary table; and
one or more memories having stored thereon computer-readable instructions that, upon execution, cause the system to at least:
construct a mapping between a first value and an indication of an aggregation function, the first value stored in the primary table, and between the first value and an indication of a permissible level of application consistency;
identify a set of rows in the secondary table, the set of rows corresponding to deferred requests to update the first value, the set of rows identified based on information indicative of a location of the first value;
compute an aggregate value by applying an aggregation function to the set of rows, the aggregation function corresponding to the indication of an aggregation function; and
update the first value using the aggregate value.

23. The system of claim 22, further comprising the one or more memories having stored thereon computer-readable instructions that, upon execution, cause the system to at least:
update the first value using the aggregate value based on a threshold amount of time elapsing.

24. The system of claim 22, wherein the mapping comprises information stored in the secondary table.

25. The system of claim 22, wherein the permissible level of application consistency is indicative of a permissible delay in updating the first value.

26. The system of claim 22, wherein the indication of an aggregation function corresponds to one of summation, averaging, mean or median determination, counting, determination of a most or least recent value, determination of minimum value, determination of maximum value, or a determination of an end state.

27. The system of claim 22, further comprising the one or memories having stored thereon computer-readable instructions that, upon execution, cause the system to at least:

determine that a new value based on the first value and the aggregate value is invalid.

* * * * *